United States Patent Office 2,696,475
Patented Dec. 7, 1954

2,696,475

METHOD OF PREPARATION OF SUPPORTED NICKEL, COBALT, OR COPPER CATALYSTS

Howard L. Farrow, Long Beach, Calif., assignor to Phillips Petroleum Company, a corporation of Delaware No Drawing. Application November 12, 1948, Serial No. 59,761

14 Claims. (Cl. 252—463)

This invention relates to an improved catalytic material and method of preparing the same. One aspect of the invention relates to the preparation of an unusually active catalyst comprising nickel, cobalt and/or copper, or the oxides thereof. Another aspect of the invention pertains to the catalytic conversion of hydrocarbons in the presence of the novel catalyst of the invention.

This application is a continuation-in-part of my application Serial No. 395,286, filed May 26, 1941, now abandoned.

It has long been known that nickel, cobalt, and copper may be used as catalysts for a great number of different reactions, some of the more important being hydrogenation, dehydrogenation, reductions of all kinds, desulfurization, and cracking of hydrocarbons. The metals may be used in many different forms, but it is important that the surface area be great, and in an active condition. Therefore, the steps used in preparing the catalyst greatly affect the activity of the finished product.

One of the most desirable ways of using these metals as catalysts is to coat the surfaces of, or impregnate the pores of, a carrier which ordinarily is inert so far as the reaction being catalyzed is concerned, with the active metal. Such carriers may be clays such as fuller's earth, gels such as silica gel, porous metal oxides such as activated alumina or bauxite, porcelain, asbestos, pumice, kieselguhr, charcoal, etc. The state of division of the carriers may range from a very fine powder to relatively large lumps. The finished catalyst may be used by agitating it with a liquid which is being treated with hydrogen, or it may be placed in a tower or retaining vessel and the reactants passed over it. Various other methods of contacting catalysts with the materials to be treated are well known.

Several methods of making such catalysts are discussed below with particular reference to nickel. It should be understood that certain of the methods of the prior art have also been applied to cobalt and copper compounds, and that the preparation of a catalyst according to this invention may be carried out using cobalt and copper compounds as well as nickel.

Customary starting materials for the preparation of supported nickel catalysts are soluble salts such as the sulfate, chloride, acetate, and nitrate of nickel, and complex nickel ammonium salts are sometimes also used. The carrier is impregnated with a solution of the nickel compound or with the molten salt, dried, and then metallic nickel is produced by reducing the nickel compound with a reducing gas, ordinarily hydrogen, although carbon monoxide or hydrocarbons may be used. In another method the carrier is mixed with a solution of the nickel compound, the hydroxide or carbonate of nickel is precipitated, and then the mixture of carrier and hydroxide or carbonate is filtered out, which mixture is subsequently washed free of soluble salts, dried and reduced. In any such methods the nickel compound on the carrier is sometimes first changed to the oxide by heating in a stream of air before reduction to metallic nickel.

Since catalyzed reactions occur at the surface of the catalyst, it is necessary that the surface be highly extended, and that the molecules of the catalyst be in an activated condition. The many different methods of preparing nickel catalysts have been devised with this fact in mind, and the object is to prepare a more finely divided catalyst than has been previously available. For this purpose, carbonates appear to be especially desirable, since their decomposition by heating leaves an oxide or metal which is in a finer state of division than oxides or metals prepared from other salts.

Prior art methods which have been heretofore described have various disadvantages which prevent the production of the best possible supported nickel catalyst. Simple impregnation with soluble salts or with molten salts and subsequent reduction gives a good catalyst but the nickel is not in as fine a condition as is desirable for the best results. When an insoluble nickel compound is precipitated in a slurry with the carrier, such as when the hydroxide or carbonate is produced, the carrier is not properly impregnated, since only a part of the precipitation occurs within the pores of the carrier and the major portion of the precipitate is merely in admixture with the carrier. In the case of the carbonate, and sometimes in the case of the hydroxide, the mixed carrier and precipitate must be washed very thoroughly to remove all the soluble salts present. For instance, if nickel ammonium nitrate is treated with sodium carbonate, the sodium nitrate is washed out, which takes a large quantity of wash water and much time.

It is an object of this invention to provide an improved catalyst and a method of preparing the same.

Another object of this invention is to provide a method for preparing a highly active nickel, cobalt, or copper catalyst.

Another object of this invention is to provide a method for preparing a highly active nickel, cobalt, or copper oxide catalyst.

A further object of this invention is to provide an improved method for impregnating a porous carrier with catalytically active nickel, cobalt and/or copper.

A still further object of this invention is to provide a catalyst which is economically prepared and which has more activity per weight of active material than catalysts prepared by other methods.

Yet another object of the invention is to provide an improvement in catalytic hydrocarbon conversion processes which are catalyzed by nickel, cobalt, and copper catalysts.

Other objects and advantages of this invention over previously known catalysts and their methods of preparation will be apparent from the following detailed description.

It has been found that a highly active finely divided catalyst is produced by a sequence of operations performed under conditions hereinafter more fully disclosed. A metal carbonate is first formed on a carrier in situ from complex metal ammonium salts with which the carrier has been impregnated, by contacting the impregnated carrier with carbon dioxide. After the formation of the carbonate, it is beneficial first to dry the product at temperatures below those at which decomposition of the carbonate to the oxide will occur. After this drying step the carbonate is then decomposed by heating to a temperature sufficiently high to form the oxide, after which said oxide is subjected to reduction to form the metallic catalyst. While the preliminary lower temperature drying step may be eliminated, it has been found that the inclusion of the step, permitting the decomposition to take place in the absence of much moisture, will produce a more active and hence more desirable catalytic material. The above referred to procedure has been found to be particularly effective in the preparation of metallic nickel, cobalt, and copper catalysts.

Referring specifically to the production of a nickel catalyst, by way of example, the first step is the formation of a complex nickel ammonium salt in solution. This complex must usually be prepared from a soluble nickel salt of an acid, either organic or inorganic, more volatile than phosphoric acid, such as nitric, acetic, hydrochloric, etc. By following certain procedures, however, soluble salts of less-volatile acids such as phosphoric and sulfuric may be used, as is hereinafter more fully disclosed.

After the formation of the complex nickel ammonium salt solution, the porous carrier in a suitable state of subdivision is then soaked in the solution, which may be either hot or cold, until thoroughly impregnated there-with. The carrier may be in finely divided form, in the form of porous pellets produced by conventional pelleting techniques, or in irregular crushed and screened shapes of varied mesh sizes selected according to use. Subsequent to the soaking step, the excess solution is removed, and the material is treated with a gas containing carbon dioxide in order to form a carbonate, which is subsequently heated to drive off volatile matter, and reduced to nickel metal. The treatment with a carbon-dioxide-containing gas may be done at a superatmospheric pressure if desired to hasten the carbonation and to insure complete penetration of the catalyst mass by the gas. The following conditions have been found desirable for the treatment with carbon dioxide and subsequent decomposition.

|   | Period | Time, Hours | Temp., °C |
|---|---|---|---|
| A | Carbonation | 6 | 30–40 |
| B | Drying | 2 | 65–95 |
| C | Decomposition | 2 | 250–350 |

It will be understood, of course, that considerable variations may be allowed in the time required for each step of the catalyst preparation, depending on the gas flow rates, etc., and some variations in the temperatures may also be permitted, the ranges given here being merely those which are ordinarily preferred. During the "A" period, the nickel ammonium complex is converted to nickel carbonate, nickel ammonium carbonate, and/or basic nickel carbonate, in varying degrees of hydration. During the "B" period, most or all of the residual water is driven out very slowly, thus avoiding disruption of the pores of the carrier. Decomposition of nickel carbonate is accomplished by slowly advancing the temperature to that indicated for the "C" period. Here carbon dioxide gas is given off in the decomposition of the nickel carbonate to form nickel oxide, and ammonium salts are volatilized and/or decomposed.

If economic conditions warrant, the salts of the less-volatile acids may be used as starting materials for the catalyst preparation in which case an additional step must be introduced between the "A" period and the "B" period. This step is one in which water is passed through the catalyst mass, whereby said mass is washed substantially free of simple ammonium salts, leaving only the nickel carbonate, nickel ammonium carbonate, and/or basic nickel carbonate on the carrier. Following this procedure, the "C" period is limited to decomposition of the carbonate to the oxide, since there are no ammonium salts present to be volatilized. Of course, any ammonia which may have remained combined in a nickel compound will be driven off. The said washing step may also be employed when salts of the more volatile acids are utilized, but it is seldom as efficient as following the "A," "B," and "C" procedure and volatilizing the ammonium salts.

In any case, after either the "A," "B," or "C" period, but, preferably after the "B" period, if desired, the impregnated carrier may be returned to the solution of the nickel ammonium salt for a time in order to put additional active material on the carrier, and the various steps of the catalyst preparation repeated. The use of hydrogen or other reducing gas is employed as a final step in treating the catalyst at about 300 to 500° C. for about four hours. The metal oxide is thus reduced to the metal, with elimination of water, and hydrogen may then be occluded on the catalyst by cooling in a stream of hydrogen, if that gas is being used.

As an example showing the preparation of a catalyst in accordance with the principles discussed above, I shall describe the preparation of a nickel catalyst supported on activated alumina. One part by weight of nickel nitrate hexahydrate crystals was mixed with two parts by weight of water. Sufficient 28 per cent ammonium hydroxide was added to form the complex salt. Upon the initial addition of the ammonium hydroxide, nickel hydroxide precipitated but with continued addition, the hydroxide dissolved, leaving a solution of the complex salt. Just enough ammonium hydroxide was added to cause the hydroxide to dissolve. Next, a quantity of activated alumina granules having a size of about 4 to 8-mesh, previously heated to 120° C., was placed in the solution and allowed to remain therein at room temperature for a period of 7 hours. The excess solution was then drained off and the wet catalyst mass was placed in a vertical tower and heated to 35° C. while a slow stream of carbon dioxide was passed upwards through the tower at atmospheric pressure. After 6 hours of this treatment, the heat to the tower was increased and the tower temperature rose to 80° C. within about one hour, and increased to 95° C. in the next hour, with carbon dioxide still passing through. Next, the temperature was increased to 150° C. in one hour, and to 300° C. in the next hour. A slight flow of hydrogen was then started into the tower along with the carbon dioxide and the hydrogen flow was gradually increased while the carbon dioxide flow was decreased so that within one hour only hydrogen was passing over the catalyst mass. Meanwhile, the temperature was increased to 400° C., and then further increased to 450° C. within the next hour and allowed to remain at that temperature for two more hours. The finished catalyst was then cooled in the presence of hydrogen.

In order to test its utility as a hydrogenation catalyst, the catalyst thus prepared was used in the hydrogenation of a dewaxed lubricating oil. The fines were screened from the catalyst, and the oil was placed along with the catalyst in a pressure bomb. Hydrogen was admitted to a pressure of 5,000 pounds per square inch gage and the bomb was held at 345° C. and rocked back and forth. At the end of two hours, the rocking was stopped, the pressure was released and the oil was separated from the catalyst. The data below show the properties of the hydrogenated oil compared to the properties of the unhydrogenated oil. It is apparent from the Indiana accelerated oxidation test that a very stable lubricating oil was obtained from the hydrogenation.

|  | Charge | |
|---|---|---|
|  | Bottoms from Dewaxed Oil | Hydrogenated Oil |
| Gravity ° A.P.I. | 27.8 | 28.6 |
| Flash, ° F. | 440 | 440 |
| Fire, ° F. | 520 | 515 |
| Pour Point, ° F. | 5 | 5 |
| Saybolt Viscosity: | | |
| 100° F. | 687 | 657 |
| 210° F. | 70.7 | 70.0 |
| Conradson Carbon Residue | 0.19 | 0.04 |
| N. P. A. Color | Dark | 1 |
| Viscosity Index | 88 | 90.5 |
| Percent Yield | | 100 |
| Indiana Oxidation | Not run | |
| Sludge— | | |
| 10 mg. | | |
| 90 hours | | nil |
| Viscosity Increase— | | |
| 50 hours | | 24% |
| 90 hours | | 41% |

As mentioned before, the technique used in preparing a catalyst greatly influences its final properties and activity. The use of solutions is better than the use of molten salts to give a catalyst with the greatest activity per weight of metal, because only a thin surface layer of the metal compound is placed on the carrier, whereas if molten salts are used, the carrier becomes coated with a considerable thickness of catalytic material, thus wasting some of the metal, since only the surface is effective. A more complete impregnation of all the pores is accomplished by using solutions rather than molten salts. The use of the complex ammonium compound has a number of advantages. The ammoniacal solution has a lower viscosity than other solutions of the metal salts, and of course a much lower viscosity than molten salts, and thus penetration of the carrier pores is facilitated. Solutions of the complex ammonium salts are much less corrosive than the corresponding solutions of the simple salts, and thus may be stored, pumped, and otherwise handled more economically and conveniently.

The carbonation period of this invention has a dual advantage over processes of the prior art. In the first place, carbon dioxide gas easily penetrates into all of the pores of the carrier, thus effecting the complete formation of the metal carbonate and/or basic carbonate in situ. Not only is all of the metal present on the carrier converted, but there is no mechanical loss of the carbonate from the pores such as occurs if the carbonation is carried out while the catalyst mass is suspended in a liquid, as taught by the prior art. Thus, the pores of the carrier are first impregnated with a soluble salt and the carbonate, oxide, and finally metal subsequently formed are always in the most satisfactory form of a highly extended surface film. Furthermore, no additional precipitate is mixed mechanically with the carrier to clog the pores and form a thick, wasteful, and less active film. In the second place, no washing step of any kind is ordinarily necessary. When salts other than nickel, cobalt or copper compounds are present, which occurs when the carbonate is precipitated according to previously known methods, the prior art teaches that it is important that the catalyst mass undergo a very complete washing for the purpose of eliminating such salts, since their presence even in quite minor amounts greatly inhibits or destroys the catalytic action. The disadvantages of such a washing step are so obvious that it is hardly necessary to discuss them. However, when a carbonate catalyst is prepared according to the present invention, the undesired salts are merely volatilized and/or decomposed during the decomposition or reduction period. As previously explained, it may be found desirable occasionally to wash out these volatile salts rather than to eliminate them by heating. This can, of course, be done by passing water through the catalyst mass after the carbonation period. This is a relatively simple procedure since the metal carbonate is held in the pores of the carrier and filtration is unnecessary. Ordinarily though, in the case of salts of the more volatile acids, it is better to avoid the washing process and to use heat for removal of ammonium salts.

A further explanation of the process involved in the utilization of salts of the less-volatile acids will now be given. If nickel sulfate, for instance, is used, the ammonium sulfate formed during the carbonation period would break down on heating to give ammonia gas and sulfuric acid. The sulfuric acid being relatively non-volatile would remain in the catalyst mass and nickel sulfate would be formed, the reduction of which to nickel oxide or nickel metal is almost impossible under the ordinary conditions of catalyst formation. Thus, it is impractical for preparing a nickel catalyst, especially since even very small amounts of residual sulfur would act as a poison. The same principles apply to the use of phosphates. Thus, a washing step is necessary to eliminate the ammonium salts of such relatively non-volatile acids and economic considerations will dictate the choice of starting materials in view of the extra step which may be involved in the catalyst preparation.

The drying period of this invention is of considerable importance. For the best results, the water should be driven off slowly so that the pores of the catalyst, or the gel structures as the case may be, are not broken up by the rapid formation and escape of steam. The presence of the carbon dioxide during this step is desirable in order to assure the completion of the change from the nitrate or other salt to the carbonate. The temperatures of drying are such that no appreciable decomposition of the carbonate to form the oxide occurs, although various changes in the composition of the complex molecules occur, such as loss of varying amounts of water of hydration, ammonia, and sometimes loss of some carbon dioxide to give hydroxides, etc. However, no metal oxide is formed.

During the decomposition period, it is not essential that carbon dioxide be passed over the catalyst, although it is somewhat desirable to do so during the early part of the period when some moisture may still be present. Air may be used, and only sufficient gas need be passed during this period to sweep away the vapors from the volatile salts and the carbon dioxide formed by decomposition of the carbonate. It is appreciated that the decomposition of ammonium salts on heating will give some free acid which in turn may react with nickel carbonate to re-convert the nickel to a salt of the liberated acid. However, a certain amount of such action will not affect undesirably the properties of the finished catalyst. Because of the absence of an appreciable amount of water, it is believed that the reaction between the liberated acid and the nickel carbonate does not occur to any great extent.

When reduction of the oxide is started, it is very important that hydrogen be admitted slowly. The reaction is exothermic, and so much heat may be generated at the catalyst surface during the early part of the reduction that sintering of the catalyst may occur, with consequent serious loss in activity. The procedure described in the example above is a very satisfactory method of handling this important part of the catalyst preparation. Other means for the prevention of overheating during reduction can, of course, be used, such as applying vacuum to the catalyst mass, and then slowly admitting hydrogen, or the flow may be made very small until the major portion is reduced, or other gases than carbon dioxide may be used as diluents for the hydrogen or other reducing gas. It is not desirable to heat the catalyst to a temperature higher than that required for complete reduction. Contrary to some previous teachings, it is not always necessary to effect a complete reduction, since the presence of some oxide may be found desirable. The use to which the catalyst is put will determine whether complete reduction is essential. In some cases, for instance in the hydrogenation of polymer gasoline, the reaction mixture may be passed directly over the supported oxide, and the reduction takes place while the hydrogenation proceeds.

If the finished catalyst is cooled before use, it is best to do this in the presence of hydrogen. The occlusion of hydrogen in this manner seems to improve the activity in hydrogenation and other reductions. Also, it is desirable to avoid contacting the active metal with air, otherwise poisoning by means of oxygen may occur. Of course, since even small traces of sulfur and halogens will poison such catalyst, care should be taken throughout the various steps of preparation to protect the material being worked on from contamination with material containing such poisons.

An advantageous method of making a catalyst in conformity with the teachings of this invention is to use flue gas, or similar industrial gases, containing appreciable quantities of carbon dioxide, rather than carbon dioxide gas alone. Such a gas is usually available in almost any industrial plant at a negligible cost. The only necessary precaution is that it not contain poisoning substances, such as carbon monoxide or sulfur compounds. A purification of the gas would be necessary in order to remove such poisons if present.

Another method of preparing a catalyst by using the principles of this invention is to impregnate a carrier with an aqueous solution of nickel, cobalt, or copper salt, and then to pass over the impregnated carrier a gas containing both carbon dioxide and ammonia to form the metal carbonate. The subsequent steps are then accomplished in any manner hereinbefore described.

Of course some reactions are catalyzed by a metal oxide catalyst, and the advantages inherent in the preparation herein described are available for the production of supported nickel, cobalt, and copper oxides.

I claim:

1. A process for the preparation of a supported catalyst, which comprises impregnating a porous carrier with an aqueous solution of a complex ammonium salt of a metal selected from the group consisting of nickel, cobalt and copper, removing the excess solution from the impregnated carrier, treating said impregnated carrier with a gas comprising essentially carbon dioxide to precipitate a substantial proportion of the complex metal ammonium salt in the presence of water as a metal carbonate on the carrier, drying the resulting product at a temperature within the range of 65° C. to 95° C., thereafter heating said product in the absence of a reducing gas at a temperature within the range of 250° to 350° C., to convert the metal carbonate to metal oxide, and subsequently heating the resulting product in the presence of a reducing gas at a temperature within the range of 300° to 500° C., to convert the metal oxide to catalytically active metal.

2. A process for the preparation of a supported nickel catalyst, which comprises impregnating a porous carrier with an aqueous solution of a complex nickel ammonium salt, removing the excess solution from the impregnated carrier, treating said impregnated carrier with a gas essentially comprising carbon dioxide to precipitate a substantial proportion of the complex nickel ammonium salt in the presence of water as a nickel carbonate on the carrier, drying the resulting product at a temperature within the range of 65° to 95° C., thereafter heating said product in the absence of a reducing gas at a temperature within the range of 250° to 350° C., to convert the nickel carbonate to nickel oxide, and subsequently heating the resulting product in the presence of hydrogen at a temperature within the range of 300° to 500° C., to convert the nickel oxide to catalytically active nickel metal.

3. A process for the preparation of a supported cobalt catalyst, which comprises impregnating a porous carrier with an aqueous solution of a complex cobalt ammonium salt, removing the excess solution from the impregnated carrier, treating said impregnated carrier with a gas comprising essentially carbon dioxide to precipitate a substantial proportion of the complex cobalt ammonium salt in the presence of water as a cobalt carbonate on the carrier, drying the resulting product at a temperature within the range of 65° to 95° C., thereafter heating said product in the absence of a reducing gas at a temperature within the range of 250° to 350° C., to convert the cobalt carbonate to cobalt oxide, and subsequently heating the resulting product in the presence of hydrogen at a temperature within the range of 300° to 500° C., to convert the cobalt oxide to catalytically active cobalt.

4. A process for the preparation of a supported copper catalyst which comprises impregnating a porous carrier with an aqueous solution of a complex copper ammonium salt, removing the excess solution from the impregnated carrier, treating said impregnated carrier with a gas comprising essentially carbon dioxide to precipitate a substantial proportion of the complex copper ammonium salt in the presence of water as a copper carbonate on the carrier, drying the resulting product at a temperature within the range of 65° to 95° C., thereafter heating said product in the absence of a reducing gas at a temperature within the range of 250° to 350° C., to convert the copper carbonate to copper oxide, and subsequently heating the resulting product in the presence of hydrogen at a temperature within the range of 300° to 500° C., to convert the copper oxide to catalytically active copper.

5. A process for the preparation of a supported catalyst, which comprises impregnating a porous carrier with an aqueous solution of a complex ammonium salt of a metal selected from the group consisting of nickel, cobalt and copper, removing the excess solution from the impregnated carrier, treating said impregnated carrier with a gas comprising essentially carbon dioxide to precipitate a substantial proportion of the complex metal ammonium salt in the presence of water as a metal carbonate on the carrier, drying the resulting product at a temperature within the range of 65° C. to 95° C., and thereafter heating said product in the absence of a reducing gas at a temperature within the range of 250° to 350° C., to convert the metal carbonate to metal oxide.

6. A process for the preparation of a supported nickel catalyst, which comprises impregnating a porous carrier with an aqueous solution of a complex nickel ammonium salt, removing the excess solution from the impregnated carrier, treating said impregnated carrier with a gas essentially comprising carbon dioxide to precipitate a substantial proportion of the complex nickel ammonium salt in the presence of water as a nickel carbonate on the carrier, drying the resulting product at a temperature within the range of 65° to 95° C., and thereafter heating said product in the absence of a reducing gas at a temperature within the range of 250° to 350° C., to convert the nickel carbonate to nickel oxide.

7. A process for the preparation of a supported cobalt catalyst, which comprises impregnating a porous carrier with an aqueous solution of a complex cobalt ammonium salt, removing the excess solution from the impregnated carrier, treating said impregnated carrier with a gas comprising essentially carbon dioxide to precipitate a substantial proportion of the complex cobalt ammonium salt in the presence of water as a cobalt carbonate on the carrier, drying the resulting product at a temperature within the range of 65° to 95° C., and thereafter heating said product in the absence of a reducing gas at a temperature within the range of 250° to 350° C., to convert the cobalt carbonate to cobalt oxide.

8. A process for the preparation of a supported copper catalyst which comprises impregnating a porous carrier with an aqueous solution of a complex copper ammonium salt, removing the excess solution from the impregnated carrier, treating said impregnated carrier with a gas comprising essentially carbon dioxide to precipitate a substantial proportion of the complex copper ammonium salt in the presence of water as a copper carbonate on the carrier, drying the resulting product at a temperature within the range of 65° to 95° C., and thereafter heating said product in the absence of a reducing gas at a temperature within the range of 250° to 350° C., to convert the copper carbonate to copper oxide.

9. The process of claim 2 in which the porous carrier is an activated alumina.

10. The process of claim 3 in which the porous carrier is an activated alumina.

11. The process of claim 4 in which the porous carrier is an activated alumina.

12. The process of claim 6 in which the porous carrier is an activated alumina.

13. The process of claim 7 in which the porous carrier is an activated alumina.

14. The process of claim 8 in which the porous carrier is an activated alumina.

References Cited in the file of this patent

UNITED STATES PATENTS

| Number | Name | Date |
|---|---|---|
| 1,084,258 | Ellis | Jan. 13, 1914 |
| 1,122,811 | Snelling | Dec. 29, 1914 |
| 1,156,674 | Ellis | Oct. 12, 1915 |
| 1,158,664 | Ellis | Nov. 2, 1915 |
| 1,956,585 | Oglesby et al. | May 1, 1934 |
| 2,118,001 | Andrews et al. | May 17, 1938 |
| 2,184,235 | Groll et al. | Dec. 19, 1939 |
| 2,258,786 | Melaven et al. | Oct. 14, 1941 |
| 2,267,735 | Ipatieff et al. | Dec. 30, 1941 |
| 2,289,916 | Komarewsky | July 14, 1942 |
| 2,322,095 | Schmidt | June 15, 1943 |
| 2,328,719 | Houghton et al. | Sept. 7, 1943 |
| 2,348,418 | Roesch et al. | May 9, 1944 |
| 2,392,107 | Teter | Jan. 1, 1946 |